United States Patent
Kadam et al.

(10) Patent No.: US 9,804,786 B2
(45) Date of Patent: Oct. 31, 2017

(54) SECTOR TRANSLATION LAYER FOR HARD DISK DRIVES

(71) Applicant: Seagate Technology LLC, Cupertino, CA (US)

(72) Inventors: Prasad Ramchandra Kadam, Pune (IN); KaruppuSwamy Thangaraj, Pune (IN); Jameer Babasaheb Mulani, Sangli (IN)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 69 days.

(21) Appl. No.: 14/730,472

(22) Filed: Jun. 4, 2015

(65) Prior Publication Data

US 2016/0357452 A1 Dec. 8, 2016

(51) Int. Cl.
*G06F 3/06* (2006.01)
*G06F 12/10* (2016.01)
(Continued)

(52) U.S. Cl.
CPC ............ *G06F 3/0611* (2013.01); *G06F 3/064* (2013.01); *G06F 3/068* (2013.01); *G06F 3/0658* (2013.01); *G06F 3/0659* (2013.01); *G06F 12/10* (2013.01); *G11B 5/012* (2013.01); *G11B 20/10* (2013.01); *G11B 20/1217* (2013.01); *G06F 2212/1024* (2013.01); *G06F 2212/152* (2013.01);
(Continued)

(58) Field of Classification Search
CPC ...... G06F 3/0611; G06F 3/068; G06F 3/0658; G06F 3/0659; G06F 3/064; G06F 3/0638; G06F 3/0674; G06F 3/0676; G06F 12/10; G06F 2212/70; G06F 2212/1024; G06F 2212/152; G06F 2212/657; G06F 2212/217; G11B 20/1217; G11B 5/09; G11B 2020/1232; G11B 2020/1238
See application file for complete search history.

(56) References Cited

U.S. PATENT DOCUMENTS 5,619,690 A * 4/1997 Matsumani ........... G06F 3/0601
5,761,166 A * 6/1998 Sedlmayr ............... G11B 5/012
                                                                 360/69

(Continued)

OTHER PUBLICATIONS

Arpaci-Dusseau, Remzi et al., "Operating Systems: Three Easy Pieces", Arpaci-Dusseau Books, LLC, Mar. 31, 2015, pp. 1-17.

Primary Examiner — Michael Krofcheck
(74) Attorney, Agent, or Firm — Christopher P. Maiorana, P.C.

(57) ABSTRACT

An apparatus having a memory and a controller is disclosed. The memory may have a write head and sectors in tracks. The controller may have a sector map and a translation map and may be configured to (i) receive a write command having a logical block address and a range value, (ii) examine the sector map to find a sector sequence (a) marked free, (b) about to reach the write head and (c) at least as long as the range value, (iii) write new data in the sector sequence, (iv) update the translation map to associate the logical block address of the write command with a physical address of the written sectors and (v) update the sector map according to the sectors written. Each entry in the sector map generally corresponds to a respective sector and indicates whether the respective sector contains valid data or is free.

20 Claims, 13 Drawing Sheets

(51) Int. Cl.
    *G11B 5/09*       (2006.01)
    *G11B 20/12*      (2006.01)
    *G11B 5/012*      (2006.01)
    *G11B 20/10*      (2006.01)

(52) U.S. Cl.
    CPC .. *G06F 2212/217* (2013.01); *G06F 2212/657* (2013.01); *G06F 2212/70* (2013.01); *G11B 2020/1232* (2013.01); *G11B 2020/1294* (2013.01)

(56) References Cited

U.S. PATENT DOCUMENTS

| | | | |
|---|---|---|---|
| 6,745,284 B1 | 6/2004 | Lee et al. | 711/114 |
| 7,010,645 B2 | 3/2006 | Hetzler et al. | 711/113 |
| 7,027,241 B2 | 4/2006 | Chu et al. | 360/31 |
| 8,014,098 B1* | 9/2011 | Kuehlwein | G11B 5/012 360/68 |
| 2005/0069292 A1* | 3/2005 | Yokota | G06F 3/0605 386/241 |
| 2005/0078949 A1* | 4/2005 | Asano | G11B 27/105 386/316 |
| 2007/0288692 A1* | 12/2007 | Bruce | G06F 3/061 711/113 |
| 2009/0019216 A1* | 1/2009 | Yamada | G06F 3/061 711/103 |
| 2011/0119455 A1* | 5/2011 | Tsai | G06F 3/0608 711/154 |
| 2013/0242425 A1 | 9/2013 | Zayas et al. | 360/15 |
| 2016/0133324 A1* | 5/2016 | Alrod | G11C 13/0097 365/148 |

* cited by examiner

_US 9,804,786 B2_

SECTOR TRANSLATION LAYER FOR HARD DISK DRIVES

FIELD OF THE INVENTION

The present invention relates to hard disk drives generally and, more particularly, to a method and/or architecture for a sector translation layer for hard disk drives.

BACKGROUND OF THE INVENTION

Accessing a sector of a conventional rotating media to read or write data involves delays called a seek time delay and a rotational latency delay. The seek time delay measures a time for a head assembly on an actuator arm to travel to a track of a disk platter where the data is read or written. The rotational latency is a delay waiting for the rotation of the disk platter to bring the requested sector to the head assembly. Both types of delay impact data transfer performance. The impact can be significant during random reads and/or writes.

It would be desirable to implement a sector translation layer for hard disk drives.

SUMMARY OF THE INVENTION

The present invention concerns an apparatus having a memory and a controller. The memory may have a write head and sectors in tracks. The controller may have a sector map and a translation map and may be configured to (i) receive a write command having a logical block address and a range value, (ii) examine the sector map to find a sector sequence (a) marked free, (b) about to reach the write head and (c) at least as long as the range value, (iii) write new data in the sector sequence, (iv) update the translation map to associate the logical block address of the write command with a physical address of the written sectors and (v) update the sector map according to the sectors written. Each entry in the sector map generally corresponds to a respective sector and indicates whether the respective sector contains valid data or is free.

The objects, features and advantages of the present invention include providing a sector translation layer for hard disk drives that may (i) improve write performance compared with conventional hard disk drives, (ii) incorporate a limited amount of NAND or NOR flash memory for mapping purposes, (iii) reduce a seek time to a writable sector, (iv) reduce rotational latency delays, (v) provide a single controller that works with both the flash and the rotating media, (vi) write to non-sequential sectors, (vii) write to multiple platter surfaces simultaneously and/or (viii) be implemented with one or more integrated circuits.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Embodiments of the present invention provide a sector translation layer for hard disk drives. The architecture generally implements a "tightly coupled hybrid" solution, meaning a controller that works with nonvolatile memory for mapping purposes and at the same time writes in (on) a rotating media. The writes may be made in sequential and/or non-sequential sectors. The architecture may improve random write performance by reducing head movement prior to the writes. Furthermore, the hard disk drive may utilize multiple heads simultaneously (or concurrently) to actively write data in (on) multiple platter surfaces.

Figure 1:
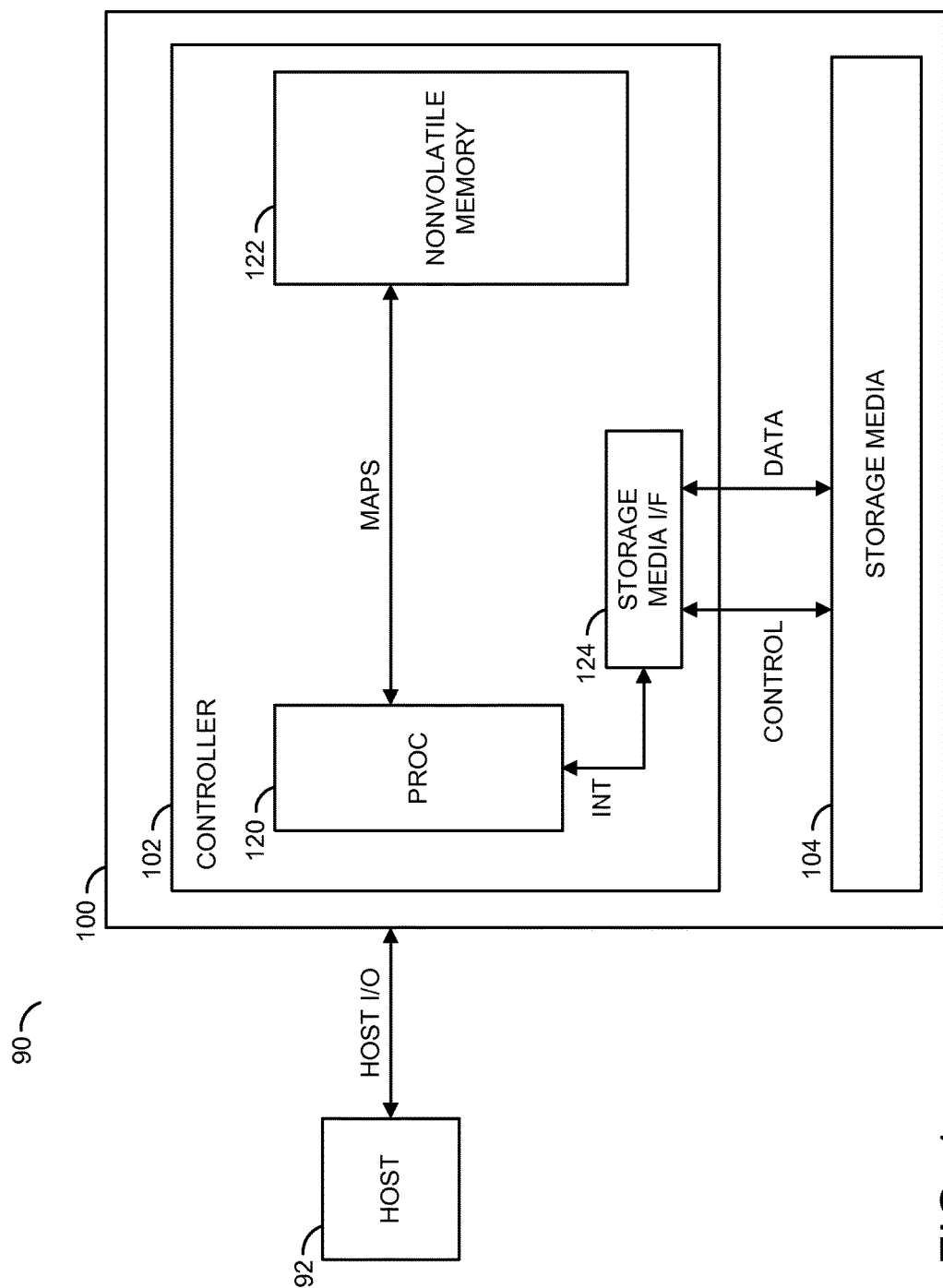
FIG. 1 is a block diagram of an apparatus in accordance with a preferred embodiment of the present invention.

Referring to FIG. 1, a block diagram of an example implementation of an apparatus 90 in accordance with a preferred embodiment of the present invention is shown. The apparatus (or circuit, system, or device) 90 generally implements a computer having rotating storage media. The apparatus 90 generally comprises a block (or circuit) 92 and a block (or circuit) 100. The circuit 100 generally comprises a block (or circuit) 102 and a block (or device) 104. The circuits 92 to 102 may represent modules and/or blocks, embodiments of which include one or more of hardware circuitry, executable code (e.g., software, microcode, programming instructions, firmware, etc.) in a storage device used by the hardware circuitry and/or one or more electronic design tools.

One or more signals (e.g., HOST I/O) may be exchanged between the circuit 92 and the circuit 100. The signal HOST I/O may be a bidirectional signal that transfers host input/output information. The signal HOST I/O generally includes, but is not limited to, a logical address component and a range value used to access data in the circuit 100, a host command component that controls the circuit 100, a write data component that transfers write data from the circuit 92 to the circuit 100 and/or a read data component that transfers read data from the circuit 100 to the circuit 92. One or more signals (e.g., CONTROL) may be exchanged between the circuit 102 and the device 104. The signal CONTROL may be a bidirectional signal that transfers control information and feedback information. The signal CONTROL generally includes, but is not limited to, a physical address component used to access data in the device 104, a memory command component that controls the device 104 (e.g., read or write commands) and/or one or more feedback components. A data signal (e.g., DATA) may be exchanged between the circuit 102 and the device 104. The signal DATA may be a bidirectional signal. The signal DATA generally conveys data written to and/or read from the device 104. Other signal components may be implemented to meet the criteria of a particular application.

The circuit 92 may implement a host circuit. The circuit 92 is generally operational to read from and write data to the device 104 via the circuit 102. When reading or writing, the circuit 92 transfers a logical address value and a range value in the signal HOST I/O to identify which set(s) of data is(are) to be written to or read from the device 104. The address generally resides in a logical address range of the circuit 92.

The circuit 92 may use a logical block addressing scheme to specify locations of data blocks stored on storage devices, generally secondary storage systems such as hard disks (e.g., the device 104). The logical block addressing scheme is generally a linear addressing scheme. The blocks may be located by an integer index, with an initial block being LBA 0, a next block being LBA 1, and so on.

The circuit 100 may implement a hard disk drive circuit. The circuit 100 is generally operational to store write data received from the circuit 92 via the signal HOST I/O. The circuit 100 may also be operational to send read data via the signal HOST I/O to the circuit 92. In various embodiments, the circuit 100 is configured to communicate with the circuit 92 using one or more communications interfaces and/or protocols. According to various embodiments, one or more communications interfaces and/or protocols may comprise one or more of a serial advanced technology attachment (e.g., SATA) interface; a serial attached small computer system interface (e.g., serial SCSI or SAS interface), a peripheral component interconnect express (e.g., PCIe) interface; a Fibre Channel interface, an Ethernet Interface (such as 10 Gigabit Ethernet), a non-standard version of any of the preceding interfaces, a custom interface, and/or any other type of interface used to interconnect storage and/or communications and/or computing devices.

The circuit 102 may implement a controller circuit. The circuit 102 is generally operational to control reading from and writing to the device 104 in response to commands and logical addresses received from the circuit 92 via the signal HOST I/O. Control of the device 104 is generally accomplished using components of the signal CONTROL. Data may be exchanged with the device 104 in the signal DATA.

The device 104 may implement one or more rotating storage media. The device 104 is generally operational to store data in a nonvolatile condition. The data may be received from and sent to the circuit 102 in the signal DATA. Control of the storage operation may be implemented by the signal CONTROL. In various embodiments, the device 104 may implement magnetic media, optical media and/or magneto-optical media. Other types of storage media may be implemented to meet the criteria of a particular application.

The circuit 102 generally comprises a block (or circuit) 120, a block (or circuit) 122 and a block (or circuit) 124. The circuits 120 to 124 may represent modules and/or blocks, embodiments of which include one or more of hardware circuitry, executable code (e.g., software, microcode, programming instructions, firmware, etc.) in a storage device used by the hardware circuitry and/or one or more electronic design tools. Additional circuitry may be implemented in the circuit 102 to meet the criteria of a particular application.

A signal (e.g., MAPS) may be exchanged between the circuit 120 and the circuit 122. The signal MAPS may be a bidirectional signal that transfers a multi-layer address translation map and a physical address free sector map between the circuit 120 and the circuit 122. A signal (e.g., INT) may be exchanged between the circuit 120 an the circuit 124. The signal INT may be a bidirectional signal that transfers internal communications involving data and instructs between the circuit 120 and the circuit 124 for accessing the device 104.

The circuit 120 may implement a processor circuit. The circuit 120 is generally operational to control reading to and writing from the device 104. The circuit 120 may include an ability to encode the write data received from the circuit 92. The resulting encoded write data may be stored in the device 104. The circuit 120 may also include an ability to decode the read data received from the device 104. The resulting decoded data may be presented to the circuit 92 via the signal HOST I/O and/or re-encoded and written back into the circuit 120. The circuit 120 comprises one or more integrated circuits (or chips or die) implementing the controller of one or more drives, embedded storage, or other suitable control applications.

The circuit 122 may implement one or more nonvolatile (or persistent storage) memory circuits. According to various embodiments, the circuit 122 generally comprises one or more nonvolatile semiconductor devices (e.g., solid-state memories). The circuit 122 may be operational to store data in a nonvolatile condition. The circuit 122 is generally implemented as NAND flash memory, NOR flash memory, flash memory using polysilicon or silicon nitride charge storage cells, two-dimensional or three-dimensional nonvolatile memory, ferromagnetic memory, phase-change memory, racetrack memory, resistive random access memory, magnetic random access memory and similar types of memory devices and/or storage media. Other nonvolatile memory technologies may be implemented to meet the criteria of a particular application.

The circuit 124 may implement a storage media interface (I/F) circuit. The circuit 124 is generally operational to communicate with and control the device 104. The circuit 124 may also be operational to communicate with the circuit 120 via the signal INT. The data is sent to and received from the circuit 124 via the signal DATA. A command component of the signal CONTROL may govern positioning of read/write heads in the device 104. A position component of the signal CONTROL may provide a position of the read/write head to the circuit 124. A speed component of the signal CONTROL generally controls a rotational speed of one or more disk platters of the device 104.

Figure 2:
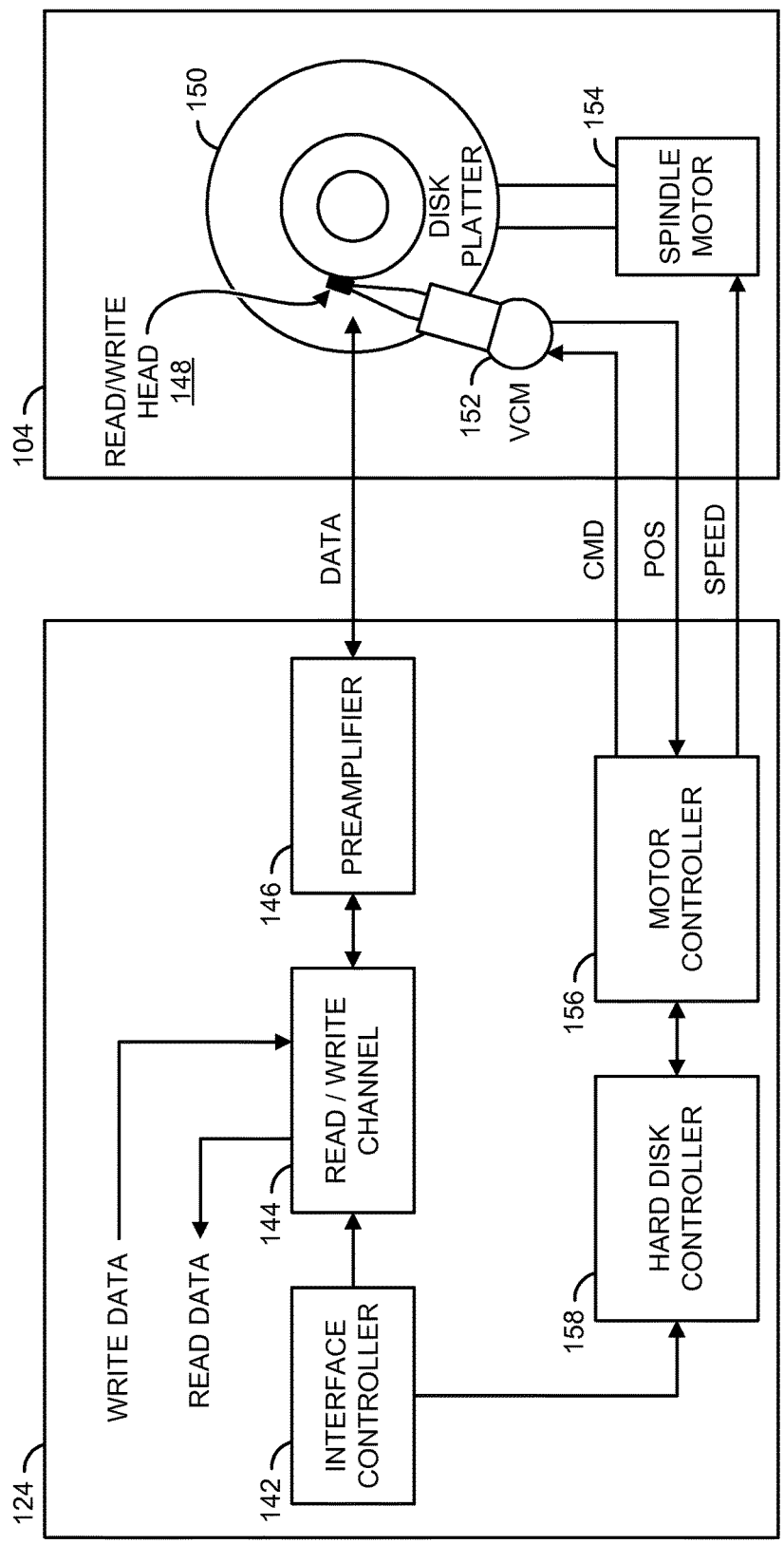
FIG. 2 is a detailed block diagram of a storage media and a storage media interface circuit.

Referring to FIG. 2, a detailed block diagram of an example implementation of the device 104 and the circuit 124 is shown. The circuit 124 generally comprises a block (or circuit) 142, a block (or circuit) 144, a block (or circuit) 146, a block (or circuit) 156 and a block (or circuit) 158. The device 104 generally comprises a block (or circuit) 148, a block (or device) 150, a block (or device) 152 and a block (or device) 154. The circuits 142 to 158 may represent modules and/or blocks, embodiments of which include one or more of hardware circuitry, executable code (e.g., software, microcode, programming instructions, firmware, etc.) in a storage device used by the hardware circuitry and/or one or more electronic design tools.

The signal DATA may be exchanged between the circuit 146 and the circuit 148. The signal CONTROL generally comprises a signal (e.g., CMD), a signal (e.g., POS) and a signal (e.g., SPEED). The signal CMD may carry command information generated by the circuit 156 that controls the device 152. The signal POS may convey position information from the device 152 to the circuit 156. The signal SPEED may be a speed control signal generated by the circuit 156 that controls a rotational speed of the device 154. The signal INT generally comprises a signal (e.g., WRITE DATA) and a signal (e.g., READ DATA). The signal WRITE DATA may be received by the circuit 144 from the circuit 120. The signal WRITE DATA generally carries write data to be stored in (on) the device 150 through the circuit 148. The signal READ DATA may be generated by the circuit 144 and transferred to the circuit 120. The signal READ DATA may carry data read from the device 150 by the circuit 148.

The circuit 142 may implement an interface controller. The circuit 142 is generally operational to control the interface between the circuit 120 and the circuits 144 and 158. Controls may include, but are not limited to, commands to start and stop the device 154 and/or commands to position the device 152. Information may include, but is not limited to, the position of the device 152.

The circuit 144 may implement a read/write channel circuit. In a write mode, the circuit 144 is generally operational to format write data in a form suitable for storage in the device 104. In a read mode, the circuit 144 may be operational to reformat the data read from the device 104.

The circuit 146 may implement a preamplifier circuit. In the write mode, the circuit 146 is generally operational to amplify the write data received from the circuit 144. In the read mode, the circuit 146 is generally operational to amplify the read data received from the device 104.

The circuit 148 may implement one or more read/write head assemblies. Each head assembly 148 generally resides at the end of an arm pivotably attached to the device 152. Each write head of each head assembly 148 is generally operational in the write mode to store the write data received in the signal DATA in the device 150. In the read mode, each read head of each head assembly 148 is operational to read data from the device 150.

The device 150 may implement one or more disk platters. Each platter 150 is generally operational to store data in (on) a nonvolatile medium. In various embodiments, each platter 150 may have two sides in which the data is stored. The data on the platter 150 generally comprises groups of magnetic signals that may be detected by the head assembly 148 when the head assembly 148 is properly positioned relative to the platter 150.

The device 152 may implement a voice coil motor (e.g., VCM) circuit. The device 152 is generally operational to position the head assembly 148 in a radial direction along the surfaces of the platter 150. The positioning of the head assembly 148 by the device 152 may be controlled by the signal MT. The actual position and/or velocity of the head assembly 148 may be reported by the device 152 in the signal POS.

The device 154 may implement a spindle motor circuit. The device 154 is generally operational to rotate the platter 150 at a speed (e.g., 5,400 to 10,000 revolutions per minute). Speed of the rotation may be controlled by the signal SPEED.

The circuit 156 may implement a motor controller. The circuit 156 is generally operational to generate the signal CMD and the signal SPEED to control the rotational speed of the platter 150 and the positioning of the head assembly 148 relative to the platter 150.

The circuit 158 may implement a hard disk controller. The circuit 158 is generally operational to control generation of the signals that govern the reading to and writing from the device 104. The circuit 158 may control operations of the device 104 through the circuit 156. The circuit 158 may provide the position and/or velocity feedback to the circuit 142.

In a typical read operation, the head assembly 148 may be accurately aligned by the circuit 156 and the device 152 to a desired data track on the platter 150. The circuit 156 both positions the head assembly 148 in relation to the platter 150 and drives the spindle motor device 154. The device 154 may spin the platter 150 at a determined spin rate (e.g., RPMs). The read channel circuit 144 may receive information from the circuit 146 and perform a data decode/detection process to recover the data (e.g., the signal READ DATA) stored by the platter 150.

In operation, the head assembly 148 may be positioned adjacent a data track on the platter 150. Magnetic signals representing data on the platter 150 may be sensed by the head assembly 148 as the platter 150 is rotated by device 154. The sensed magnetic signals may be provided as a continuous, minute analog signal representative of the magnetic data on the platter 150. The analog signal may be transferred from the head assembly 148 to the circuit 144 via the preamplifier circuit 146. The circuit 146 is generally operable to amplify the analog signals accessed from the platter 150. In turn, the read channel circuit 144 may decode and digitize the received analog signal to recreate the information originally written to the platter 150. The data is provided as read data in the signal READ DATA.

In a typical write operation, the circuit 144 may receive write data (e.g., the signal WRITE DATA) and provide the write data to the circuit 146 in a form writable to the platter 150. A write operation is substantially the opposite of the read operation with write data in the signal WRITE DATA being provided to the circuit 144. The write data may subsequently be encoded and written to the platter 150. In some embodiments, the circuit 144 is implemented as a separate integrated circuit.

In the logical block addressing scheme, sectors may be numbered as integer indexes. When mapped to CHS (cylinder-head-sector) tuples, the logical block address numbering generally starts with an initial cylinder, an initial head, and an initial sector in an initial track. Once the track is exhausted, numbering may continue to a next head, while staying in the initial cylinder. Once all of the sectors inside the initial cylinder are exhausted, the numbering generally continues to the next cylinder, and so on. Thus, the lower the logical block address value is, the closer the physical sector is to an outermost cylinder of the hard drive.

The CHS values may be mapped to the logical block addresses per formula 1 as follows:

$$LBA=(C \times HPC+H) \times SPT+(S-1), \quad (1)$$

where C, H and S may be the cylinder number, the head number, and the sector number, respectivly, LBA may be the logical block address, HPC may be a maximum number of heads per cylinder (usually reported by the disk drive, typically 16 for a 28-bit LBA) and SPT may be a maximum number of sectors per track (usually reported by the disk drive, typically 63 for the 28-bit LBA).

The logical block addresses may be mapped to the CHS values per formulae 2-4 as follows:

$$C=LBA \div (HPC \times SPT), \quad (2)$$

$$H=(LBA \div SPT) \bmod HPC, \quad (3)$$

$$S=(LBA \bmod SPT)+1, \quad (4)$$

where the operation "mod" may be a modulo operation.

Consider an example translation where S may range from 1 to 63, H may range from 0 to 15 and C may range from 0 to 31. Since each platter has two sides, a total number of platters may be 8 and hence a total number of heads is 16. Example translations of several logical block address values into corresponding CHS values may be illustrated in Table I as follows:

TABLE I

| LBA value | C, H, S Values |
| --- | --- |
| 0 | 0, 0, 1 |
| 1 | 0, 0, 2 |
| 2 | 0, 0, 3 |
| 62 | 0, 0, 63 |
| 945 | 0, 15, 1 |
| 1007 | 0, 15, 63 |
| 1008 | 1, 0, 1 |
| 1070 | 1, 0, 63 |
| 1071 | 1, 1, 1 |
| 1133 | 1, 1, 63 |
| 1134 | 1, 2, 1 |
| 2015 | 1, 15, 63 |
| 2016 | 2, 0, 1 |
| 16,127 | 15, 15, 63 |
| 16,128 | 16, 0, 1 |
| 32,255 | 31, 15, 63 |

Other numbers of cylinders, heads and sectors may be implemented to meet the criteria of a particular application.

Some common hard disk drives use a zone-bit recording (e.g., ZBR) arrangement. Without the zone-bit recording, an inner zone of the platter 150 generally has a higher bit density than an outer zone of the platter 150. With zone-bit recording, as a distance from the center of the platter 150 increases, the number of sectors in a given angle increases. Various embodiments of the circuit 100 may be implemented to work with platters 150 that do not implement the zone-bit recording. Other embodiments of the circuit 100 may be implemented to work with platters 150 that implement the zone-bit recording.

Consider the following example where the platter does not implement the zone-bit recording. Since all of the heads of the head assembly 148 generally move together, a structure of the physical address may be given by Table II as follows:

TABLE II

| C0 | H0 | H1 | ... | ... | ... ... | ... ... | H15 |
| --- | --- | --- | --- | --- | --- | --- | --- |
|  | S1 | S1 |  |  |  |  | S1 |
|  | S2 | S2 |  |  |  |  | S2 |
|  | ... | ... |  |  |  |  | ... |
|  | S63 | S63 |  |  |  |  | S63 |
| C1 | H0 | H1 |  |  |  |  | H15 |
|  | S1 | S1 |  |  |  |  | S1 |
|  | S2 | S2 |  |  |  |  | S2 |
|  | ... | ... |  |  |  |  | ... |
|  | S63 | S63 |  |  |  |  | S63 |
| C2 | H0 | H1 |  |  |  |  | H15 |
|  | S1 | S1 |  |  |  |  | S1 |
|  | S2 | S2 |  |  |  |  | S2 |
|  | ... | ... |  |  |  |  | ... |
|  | S63 | S63 |  |  |  |  | S63 |
| ... | ... | ... |  |  |  |  | ... |
| C31 | H0 | H1 |  |  |  |  | H15 |
|  | S1 | S1 |  |  |  |  | S1 |
|  | S2 | S2 |  |  |  |  | S2 |
|  | ... | ... |  |  |  |  | ... |
|  | S63 | S63 |  |  |  |  | S63 |

A similar mechanism may be used with the zone-bit recording by changing parameters in the calculations used to find the physical sector addresses. For example, the table may be adjusted to include more sectors in the outer cylinders of the platters 150.

Figure 3:
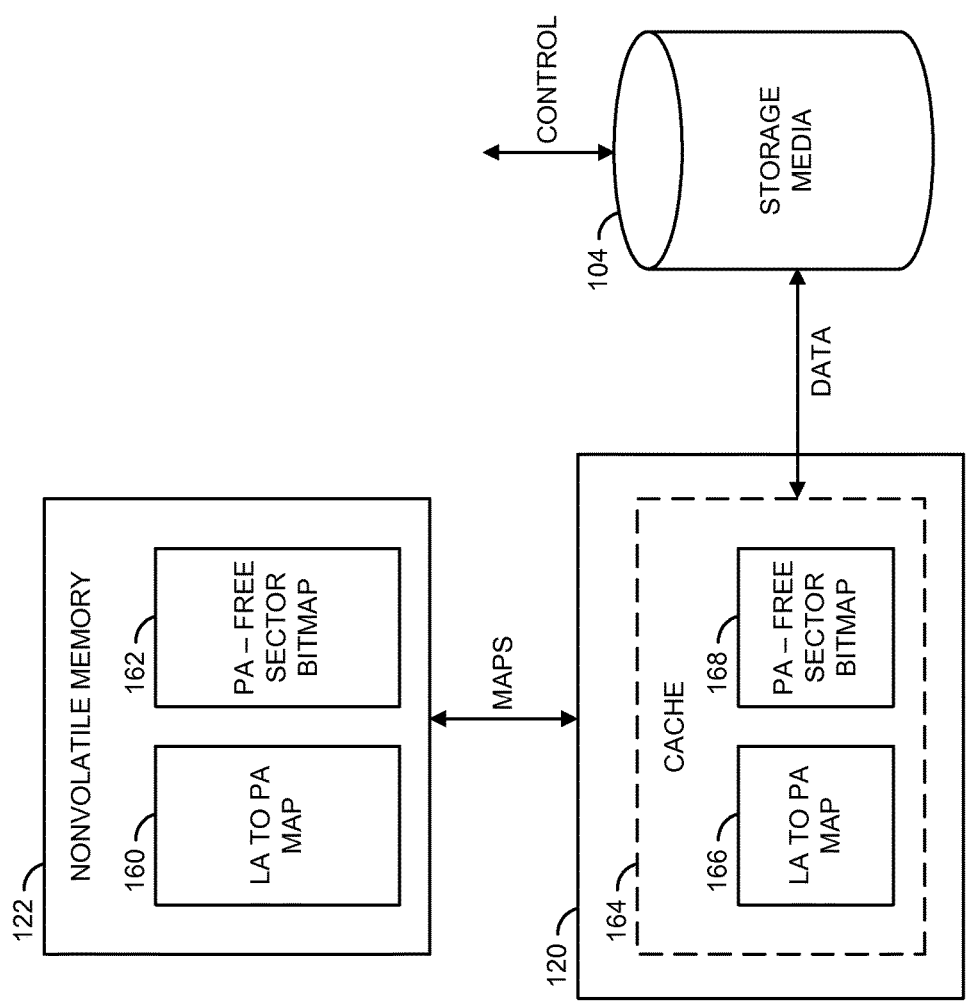
FIG. 3 is a functional flow diagram of a sector translation layer.

Referring to FIG. 3, a functional flow diagram of a sector translation layer is shown. The circuit 122 may store multiple maps (or tables) 160 and 162. The circuit 120 generally comprises a block (or circuit) 164. The circuit 164 may buffer maps (or tables) 166 and 168.

The circuit 164 may implement a cache circuit. The circuit 164 is generally operational to buffer all or a portion of each map stored in the circuit 122. In various embodiments, the circuit 164 is designed as part of the circuit 120. In other embodiments, the circuit 164 may be separate from the circuit 120.

In some embodiments, the circuit 164 may be designed as a random access memory (e.g., RAM). The RAM may have a low-access latency. The RAM may be controlled to function as a cache for the maps. In various embodiments, a common double data rate (e.g., DDR) RAM may be used to implement the circuit 164. For example, a 4,096 byte sector size with a 2 terabyte capacity in the device 104 generally results in 64 megabytes of data in the map 168.

The map 160 may implement a logical address (e.g., LA) to physical address (e.g., PA) translation map (or table). Entries of the map 160 generally identify physical addresses of sectors in the device 104 that correspond to logical block addresses generated by the circuit 92. In various embodiments, the map 160 may be implemented as a multi-level (e.g., two level) address translation layer.

The map 162 may implement a physical address free sector (e.g., PA-FREE SECTOR) bitmap. The map 162 generally maintains a flag for each sector in the device 104. In various embodiments, each flag may be a single bit. Each flag in a free state (e.g., a logical one state) generally indicates that the corresponding sector in the device 104 currently contains stale data or no data (e.g., unwritten) and so is free to be written. Each flag in an occupied state (e.g., a logical zero state) generally indicates that the corresponding sector in the device 104 currently contains valid data (e.g., written).

The map 166 may be a cached copy containing all or a portion of the map 160. In various embodiments where the map 160 is a two-level sector translation map, the map 166 may comprise the first level and portions of the second level of the map 160. Other combinations of map levels may be implemented to meet the criteria of a particular application.

The map 168 may be a cached copy containing all or a portion of the map 162. In some embodiments, the map 168 may be cached copy of the entire map 162. In other embodiments, the map 168 may contain a portion of the map 162 corresponding to the tracks (or cylinders) neighboring a current position of the head assembly 148. For example, the map 168 may include flags of the current track aligned to the head assembly 148 and flags for N (e.g., 3 to 5) tracks to either side of the current track.

Therefore, the map 168 may be used to quickly identify free (stale data or unwritten) sectors near the head assembly 148. Hence, writes may be quickly committed to the media with little to no movement of the head assembly 148. The number of neighboring tracks generally depends on the speed at which the head assembly 148 may change tracks relative to the speed at which the flags of a new track may be copied from the map 162 to the map 166.

In various embodiments, the full first level of the map 160 and the full map 162 may be copied to the maps 166 and 168 on power up. Movement of the head assembly 148 among the tracks may result in flushing out of the cache contents to the circuit 122. Existing cache content may be written out before loading the next content from the circuit 122 to the cache 164 if the existing cache content is dirty. If the cache 164 is not dirty, no writes to the circuit 122 may happen. In situation where the cache 164 is loaded only for reading, no cache flushing may be performed.

The cache flushing may be triggered on a power loss. Power loss circuitry may initiate the flushing of the cache 164 to the circuit 122. An onboard capacitor generally maintains enough charge to support the flushing of pending maps and checkpoints in the cache 164 to the circuit 122. The cache flushing may also be triggered by the circuit 92. For example, a standby immediate command (e.g., a command to move a device into a standby mode) may cause the circuit 120 to flush the contents of the cache 164 to the circuit 122. The cache flushing may also be triggered at checkpoint intervals. For example, the maps 166 and 168 may be flushed to the maps 160 and 162 every few (e.g., 2) seconds.

In some embodiments, the map 162 may be stored in a NOR flash memory. The NOR flash generally permits the map 162 to be accessed like a random access memory as the head assembly 148 moves across the platter 150. Therefore, the cached map 168 may be eliminated.

Figure 4:
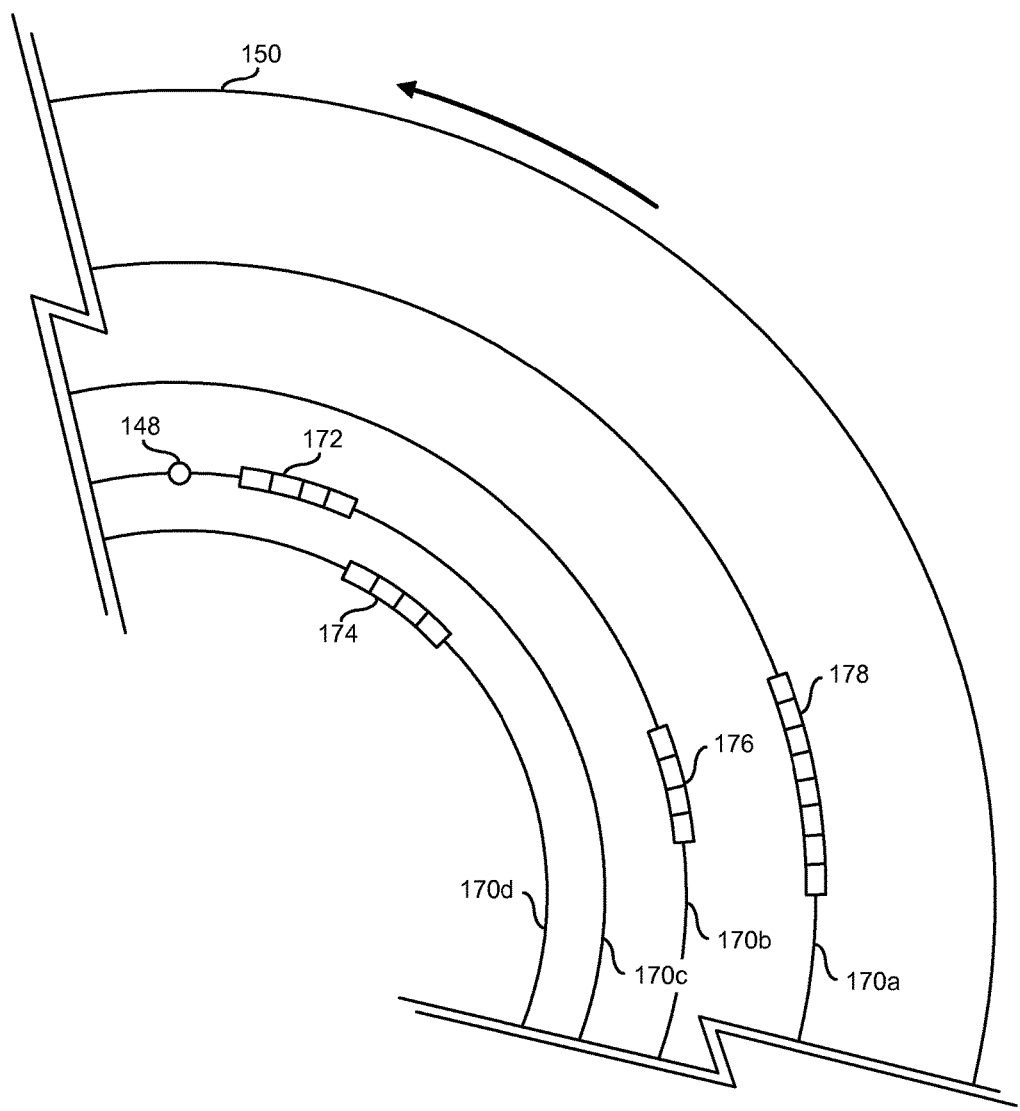
FIG. 4 is a diagram of a portion of a disk platter.

Referring to FIG. 4, a diagram of an example portion of the platter 150 is shown. The platter 150 is shown having multiple tracks (or cylinders) 170a-170d. The head assembly 148 may be currently aligned to engage a current track (e.g., 170c as shown).

The circuit 92 may issue a write command with a logical block address and a count value to the circuit 100 at any time. The circuit 102 (e.g., the circuit 120) may respond to the write command by identifying a physical address in the LA-to-PA map 166 that corresponds to the logical block address. If the physical address is in the current track (e.g., 170c) and approaching the head assembly 148, the circuit 120 may wait for the platter 150 to rotate and then write the data into the appropriate physical address. If the physical address is not in the current track (e.g., 170c), the circuit 120 may search the map 168 to locate information about one or more next free sector near where the head assembly 148 is currently placed. The circuit 120 may allocate the identified free sectors for the write and update the map 168 to indicate that the free sectors are written. The map 166 may also be updated to link the logical block address to the about-to-be-written free sectors. After the data has been written in the medium, the map 166 and/or the map 168 may be flushed to the circuit 122 based on a caching policy of the circuit 100. Updating between the maps 160 and 166 and between maps 162 and 168 may be programmable. The programming may be provided by the circuit 92 and/or during manufacturing.

Some embodiments of the circuit 100 may include one or more policies regarding writes to free sectors. Consider a case where each sector has a size of several (e.g., 4) kilobytes. Under a particular write policy (e.g., a write policy A), an initial write command may be received by the circuit 100 with a logical block address of 300 and a count value of 8 sectors. The circuit 120 may inspect the map 168 and find that a current sector at a physical address of zero is about to reach the head assembly 148.

Therefore, the free sector map 168 may be updated by the circuit 120 to indicate that the physical addresses of the sectors 0 to 7 are written. The circuit 120 may map (or link) the logical block address of 300 to the current physical address (e.g., 0) with a length of 8. The circuit 120 may optionally flush one or both of the maps 166 and/or 168 to the circuit 122.

Continuing the example, the circuit 92 may issue another write command for a logical block address of 700 with a count value of 4 sectors. The circuit 120 generally responds to the write command by checking the map 168 for free sectors. Since the head assembly 148 is still in the current track, the circuit 120 may allocate the free sectors at physical addresses 8 to 11 as written in the map 168. The map 166 may be updated to link the logical block address of 700 to the physical address of 8 with a length of 4. One or both maps 166 and/or 168 may subsequently be flushed to the circuit 122. The write data associated with the current write command may be written to the platter 150 in the sectors with the physical addresses of 8 to 11.

The circuit 92 may issue a third write command with a logical block address of 304 and a count value of 8 sectors. The circuit 120 generally responds to the write command by checking the map 168 for free sectors. Since the head assembly 148 is still in the current track, the circuit 120 may allocate the free sectors at physical addresses 12 to 19 as written in the map 168. The map 166 may be updated to link the logical block address of 304 to the physical address of 12 with a length of 8. The write data associated with the current write command may be written to the platter 150 in the sectors with the physical addresses of 12 to 19. Note that the logical block addresses 304 to 307 were previously written by the initial write command (e.g., LBA 300 with a sector count of 8) into physical addresses 4 to 7. Therefore, the circuit 120 may update the free sector map 168 to show that the sectors at the physical addresses 4 to 7 are now free (contain stale data). One or both maps 166 and/or 168 may subsequently be flushed to the circuit 122.

In some write policies (e.g., a write policy B), the circuit 120 may seek the nearest track containing a sequence of contiguous free sectors sufficiently large to store all of the data associated with the write command. Consider a case as shown in FIG. 4 where the head assembly 148 is about to reach multiple (e.g., 4) free sectors 172. If the write command has too much data for the free sectors 172 to store, the circuit 120 may conclude that the free sectors 178 are the nearest set of contiguous free sectors. Therefore, the head assembly 148 may be moved from the current track 170c to the track 170a to align with the free sectors 178. Depending on the speed of the voice coil motor 152 and the spindle motor 154, the head assembly 148 may reach the free sectors 178 in the track 170a in less than a single rotation of the platter 150 or after one or more rotations of the platter 150.

In other write policies, the circuit 120 may split writes into multiple segments of sequential free sectors. Consider again the case as shown in FIG. 4 where the head assembly 148 is about to reach the four sequential free sectors 172. A write command may be received with a sector count value of greater than four (e.g., count value=6). The circuit 120 may search the map 168 for free sectors near the current position of the head assembly 148 and conclude that the initial four sectors 172 may be written with the data associated the initial four logical block addresses. The circuit 120 may decide to write the remaining two sectors of data in the free sectors 176 (e.g., a write policy C to use temporally nearest free sectors) or in the free sectors 174 (e.g., a write policy D to use the physically nearest free sectors). Selection of the free sectors generally depends on the speed of the voice coil motor 152 and the speed of the spindle motor 154. In another write policy (e.g., a write policy E), the circuit 120 may conclude that the nearest free sectors are any free sectors within the current track. Another write policy (e.g., a write policy F) generally splits the write data into two or more parts and writes each part substantially simultaneously on a different surface of one or more platters 150. Other write policies may be implemented to meet the criteria of a particular application.

Figure 5:
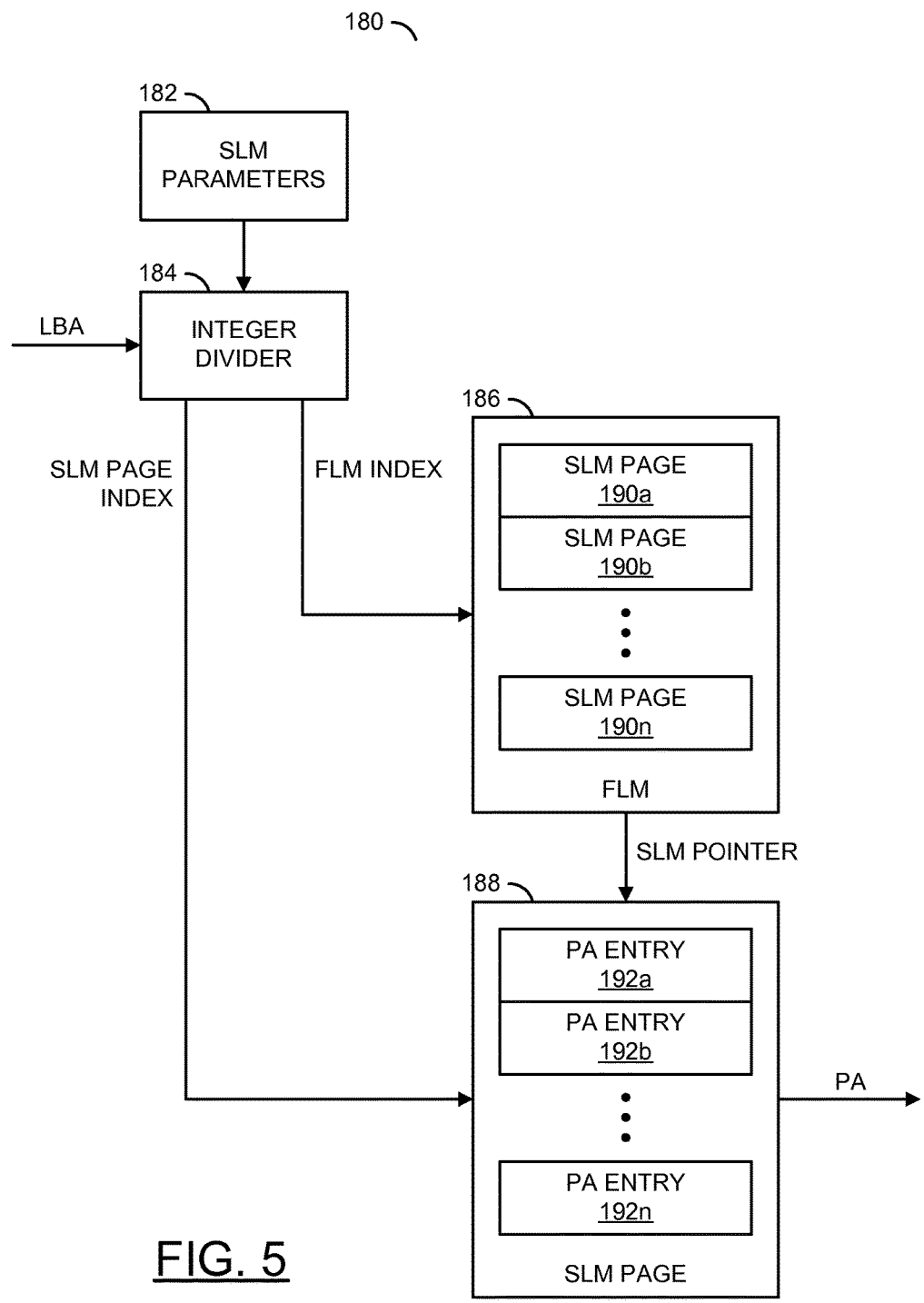
FIG. 5 is a functional flow diagram for mapping logical block addresses to physical addresses.

Referring to FIG. 5, a functional flow diagram of an example technique 180 for mapping the logical block addresses to the physical addresses is shown. The technique (or method or process) 180 may be performed by the circuits 120 and 164. The technique 180 generally comprises a step (or state) 182, a step (or state) 184, a step (or state) 186, a step (or state) 188, multiple steps (or states) 190a-190n and multiple steps (or states) 192a-192n. The steps 180 to 192n represent modules and/or blocks, embodiments of which include one or more of hardware circuitry, executable code (e.g., software, microcode, programming instructions, firmware, etc.) in a storage device used by the hardware circuitry, one or more electronic design tools, and/or other implementations.

Second-level map parameters maybe stored in programmable registers of the circuit 120 in the step 182. The circuit 92 may provide an access command (e.g., a read command or a write command) with a logical block address to the circuit 120. An integer division of the logical block address may be performed by the circuit 120 in the step 184 based on the parameters stored in the registers in the step 182. A quotient of the division generally establishes a first-level map index value (e.g., FLM INDEX). A remainder of the division forms a second-level map page index (e.g., SLM PAGE INDEX). In some embodiments, the divider step 184 may be coupled to the first-level map 186 and the one or more second-level map pages 188 (a representative single second level page is shown). In various embodiments, some or all of the process of mapping logical block addresses, such as the divider step 184, is implemented (e.g., in firmware or software) executing in the circuit 120.

A mapping of the logical block addresses to the physical addresses of the sectors in the device 104 may be a two-level map having a first-level map 186 and one or more second-level map pages 188. The two-level map may be implemented via first-level map elements coupled to one or more second-level map elements. The first-level map 186 generally includes a plurality of entries (or pages) 190a-190n. Each entry 190a-190n may contain information about a corresponding second-level map page. Each entry 190a-190n of the first-level map 186 may point to a respective one of the second-level map pages (such as the second-level map page 188).

Each second-level map page 188 may include a plurality of entries 192a-192n. Each entry 192a-192n generally contains information about a physical address of a corresponding sector.

Each entry 192a-192n may point to a location in the device 104 where data begins (e.g., a read unit storing at least the beginning of host write data for a logical block address).

The quotient FLM INDEX may be used to select a first-level map entry 190a-190n. A page field of the selected first-level map entry may be read as a second-level map pointer (e.g., SLM POINTER). The page field is used to select a second-level map 188, and the remainder SLM PAGE INDEX may be used (e.g., as an offset) to select an entry 192a-192n of the selected second-level map page 188.

A field of the selected second-level map page entry 192a-192n may be used to select a particular physical address (e.g., PA) location in the device 104 where at least a beginning of the sector sequence corresponding to the presented logical block address is stored. In various embodiments, the physical addresses include cylinder values, head values and sector values.

In various embodiments, the quotient may be used as a key to access the cache (e.g., the circuit 164), such as a fully associative cache of the second-level map pages. If a hit occurs in the cache for a particular second-level map page, a latest copy of the particular second-level map page may be found in the cache without accessing the map 160 in the circuit 122. Providing fast access to a plurality of second-level map pages enables, in some embodiments and/or usage scenarios, may result in more efficient processing of multiple independent streams of sequential data accesses to the device 104 (e.g., a stream of sequential data accesses to a region of logical block addresses interspersed with another stream of sequential data accesses to another region of logical block addresses).

Figure 6:
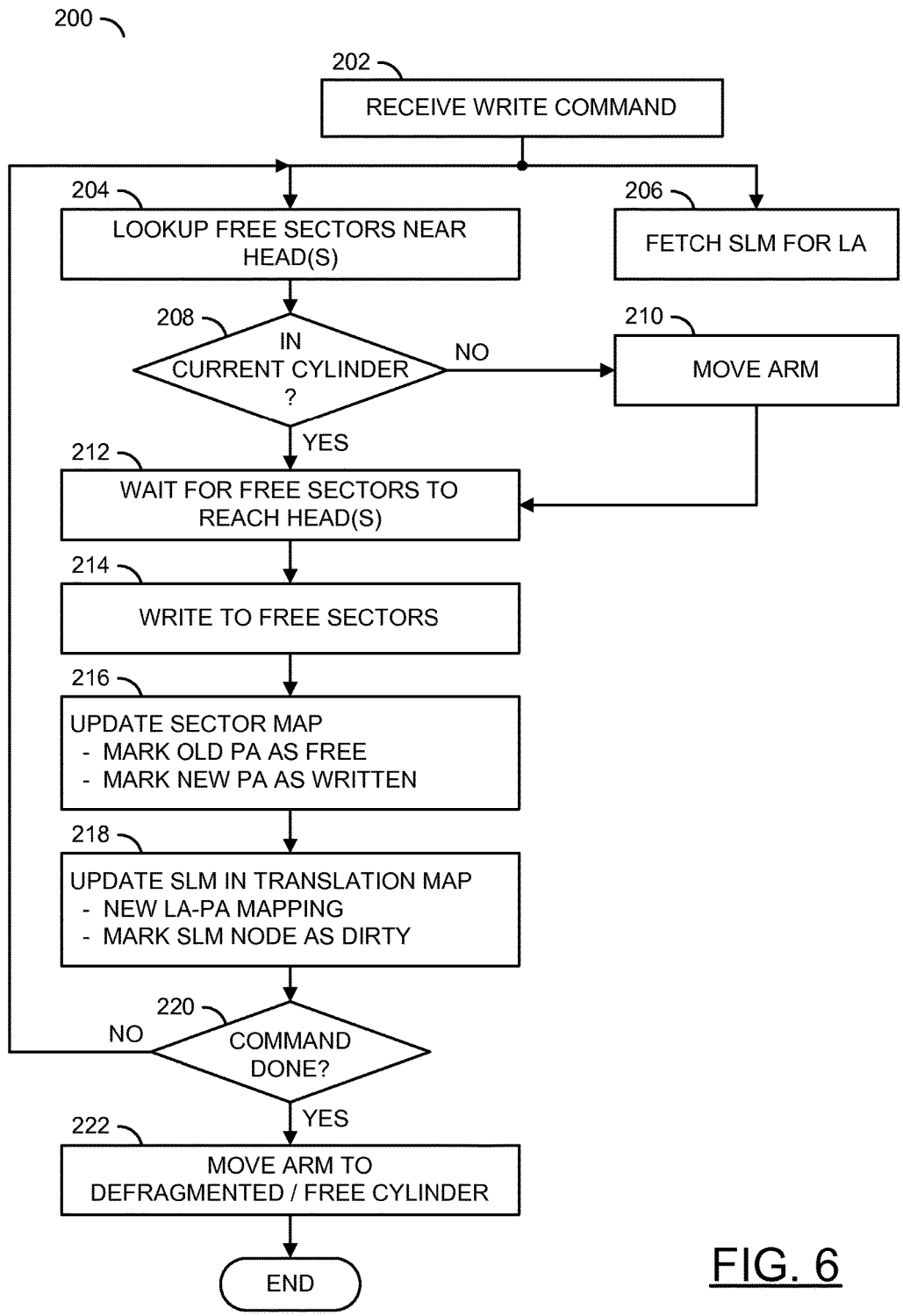
FIG. 6 is a flow diagram of a write method.

Referring to FIG. 6, a flow diagram of an example implementation of a write method 200 is shown. The method (or process or operation) 200 may be implemented by the circuits 104 and 120-124. The method 200 generally comprises a step (or state) 202, a step (or state) 204, a step (or state) 206, a decision step (or state) 208, a step (or state) 210, a step (or state) 212, a step (or state) 214, a step (or state) 216, a step (or state) 218, a decision step (or state) 220 and a step (or state) 222. The steps 202-222 may represent modules and/or blocks, embodiments of which include one or more of hardware circuitry, executable code (e.g., software, microcode, programming instructions, firmware, etc.) in a storage device used by the hardware circuitry, one or more electronic design tools, and/or other implementations. The sequence of the steps is shown as a representative example. Other step orders may be implemented to meet the criteria of a particular application.

In the step 202, the circuit 120 may receive from the circuit 92 a write command with a logical address. In parallel (or sequentially or concurrently), the circuit 120 may lookup free sectors near the heads in the step 204 and begin fetching a second level map (e.g., SLM) for the logical address in the step 206, if not already cached. In the decision step 208, the circuit 120 may determine if the nearest free sectors (per a current one or more write policies) is in the same cylinder as the head assembly 148. If the nearest free sectors are in a different cylinder, the circuits 120 and 124 may command movement of the head assembly 148 in the step 210. In the step 212, the circuit 120 may wait for the selected free sectors to reach the selected head assembly 148.

The circuits 120 and 124 and the head assembly 148 may write the write data into the free sectors in the step 214. The free sector map 168 may be updated by the circuit 120 in the step 216. If the just-written data is an updated version of previously written data currently stored in the device 104, flags of the sectors holding the now-obsolete data may be marked as free. Flags of the newly-written sectors may be marked as written.

The circuit 120 may update the translation map 166 in the step 218. The update may include changing the logical address to physical address mapping and marking the updated second level maps as dirty. A check may be performed by the circuit 120 in the step 220 to determine if the sector count of the write command is done. If more data remains to be written, the method 200 may return to the step 204 and 206 to find additional free sectors. Once all the data has been written, the circuits 120 and 124 may command movement of the head assembly 148 to a defragmented and/or free cylinder in the step 222.

Figure 7:
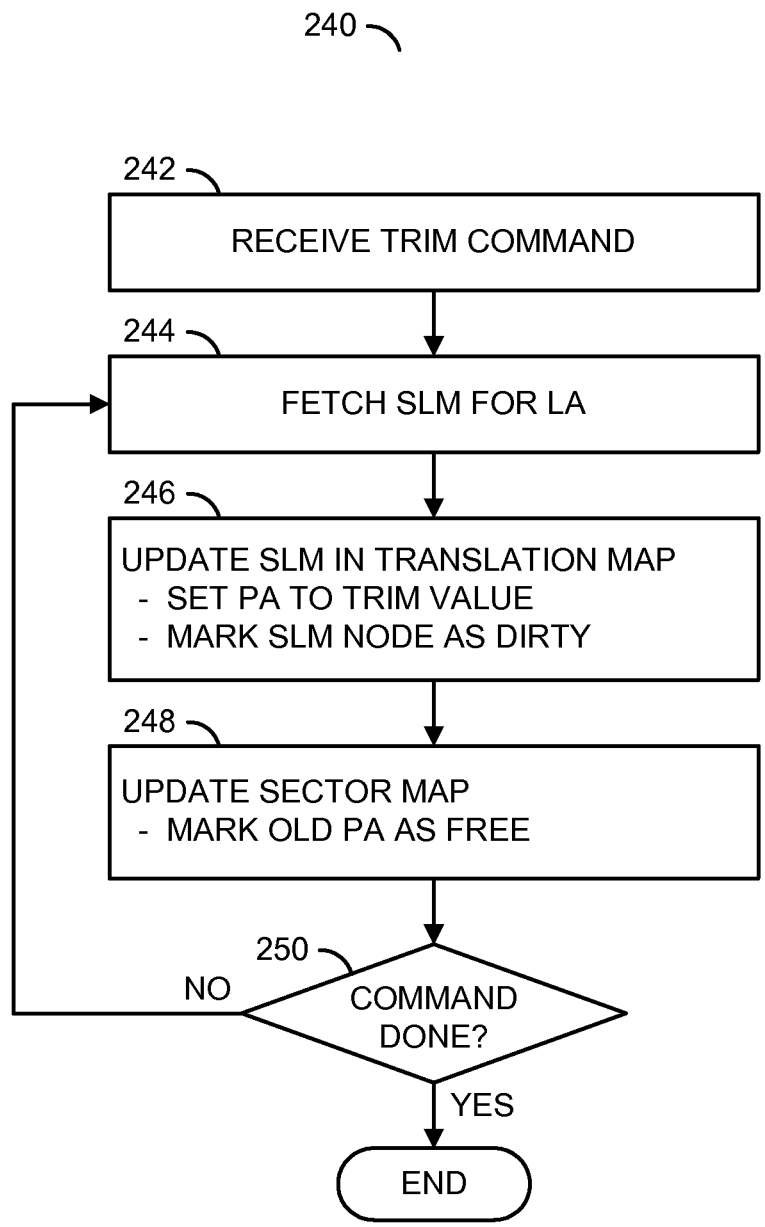
FIG. 7 is a flow diagram of a trim method.

Referring to FIG. 7, a flow diagram of an example implementation of a trim method 240 is shown. The method (or process or operation) 240 may be implemented by the circuits 104 and 120-124. The trim method 240 may be performed without accessing the device 104 or altering any data stored in (on) the device 104. The method 240 generally comprises a step (or state) 242, a step (or state) 244, a step (or state) 246, a step (or state) 248 and a decision step (or state) 250. The steps 242-250 may represent modules and/or blocks, embodiments of which include one or more of hardware circuitry, executable code (e.g., software, microcode, programming instructions, firmware, etc.) in a storage device used by the hardware circuitry, one or more electronic design tools, and/or other implementations. The sequence of the steps is shown as a representative example. Other step orders may be implemented to meet the criteria of a particular application.

In the step 242, the circuit 120 may receive a trim command from the circuit 92. The trim command generally includes a logical block address and sector count value of data stored in the device 104 that is no longer used by the circuit 92. The circuit 120 may begin fetching a second level map for the logical address in the step 244, if not already cached. In the step 246, the circuit 120 generally updates the second level map information in the translation map 166 in response to the trim command. The update may include setting the physical address to a trim value (e.g., a predetermined out of range value) and marking the second level map as dirty in the map 166. The circuit 120 may also update the free sector map 168 in the step 248 in response to the trim command. The update may mark as free the old (former) physical addresses of the trimmed sectors. A check may be performed by the circuit 120 in the step 250 to determine if all of the trimmed sectors have been processed. If not, the method 240 may return to the step 244 and fetch another second level map that corresponds to the unprocessed sectors. Once all of the trimmed sectors have been processed, the method 240 may end.

Figure 8:
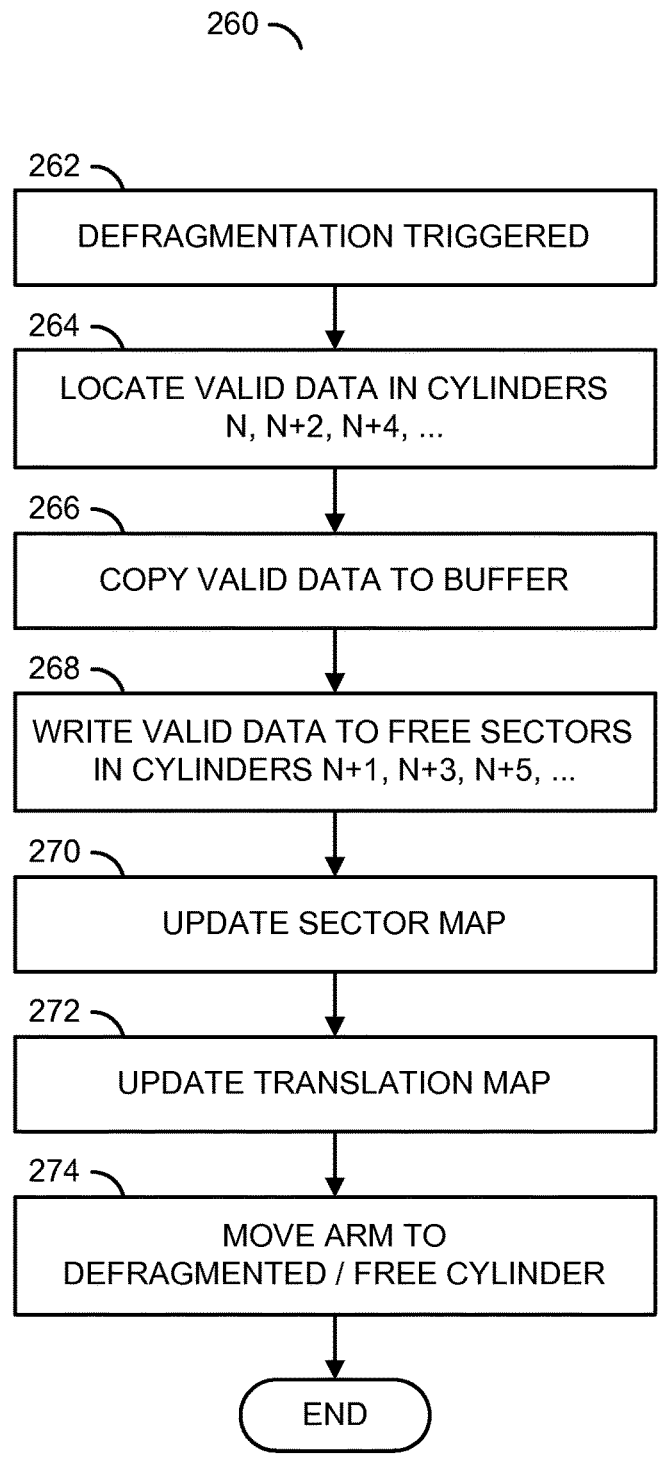
FIG. 8 is a flow diagram of a defragmentation method.

Referring to FIG. 8, a flow diagram of an example implementation of a defragmentation method 260 is shown. The method (or process or operation) 260 may be implemented by the circuits 104 and 120-124. The method 260 generally comprises a step (or state) 262, a step (or state) 264, a step (or state) 266, a step (or state) 268, a step (or state) 270, a step (or state) 272 and a step (or state) 274. The steps 262-274 may represent modules and/or blocks, embodiments of which include one or more of hardware circuitry, executable code (e.g., software, microcode, programming instructions, firmware, etc.) in a storage device used by the hardware circuitry, one or more electronic design tools, and/or other implementations. The sequence of the steps is shown as a representative example. Other step orders may be implemented to meet the criteria of a particular application.

In the step 262, a defragmentation may be triggered by the circuit 120. In various embodiments, the trigger may be an input/output rate from the circuit 92 falling below a threshold and/or the circuit 100 having time to run background tasks. The circuit 120 may locate valid data stored in the sectors of every other cylinder (e.g., cylinders N, N+2, N+4, etc.) in the step 264. In various embodiments, the sectors containing the valid data may be marked in the free sector map 168 as written. The circuit 120 may copy the valid data from some to all of the located sectors in the step 266 into a buffer. The buffered valid data may be written back to the circuit 104 in free sectors in every other (alternate) cylinder (e.g., cylinders N+1, N+3, N+5, etc.) in the step 268. In the step 270, the free sector map 168 may be updated to flag the sectors containing the valid data copied into the cylinders N+1, N+3, N+5, etc. as written, and the sectors containing the data left behind in the cylinders N, N+2, N+4, etc. as free. The circuit 120 may also update the translation map 166 in the step 272 such that the logical block addresses are translated into the new physical locations. In the step 274, the circuits 120 and 124 may command movement of the head assembly 148 into alignment with a cylinder now containing all free sectors (e.g., a defragmented/free cylinder). Creation of the defragmented cylinders full of free sectors and locating the head assembly 148 on or near such cylinders generally speeds up writes because the writes may be done into the free sectors of the defragmented/free cylinders with little to no movement of the head assembly 148. Other defragmentation sequences of written cylinders and free cylinders may be implemented to meet the criteria of a particular application.

In some embodiments, the circuit 100 may be overprovisioned. An overprovisioned circuit 100 generally has more available space on the platter 150 than is known to the circuit 92. For example, the platter 150 may provide several (e.g., 20-30) percent overprovisioning. Therefore, a track may be kept free every few tracks by the circuit 120 (e.g., 1 track free in every 4 tracks for a 25% overprovisioning). After defragmentation of the platter 150, the tracks N, N+1, N+2 and N+3 may contain the valid data while the track N+4 may be completely empty.

Figure 9:
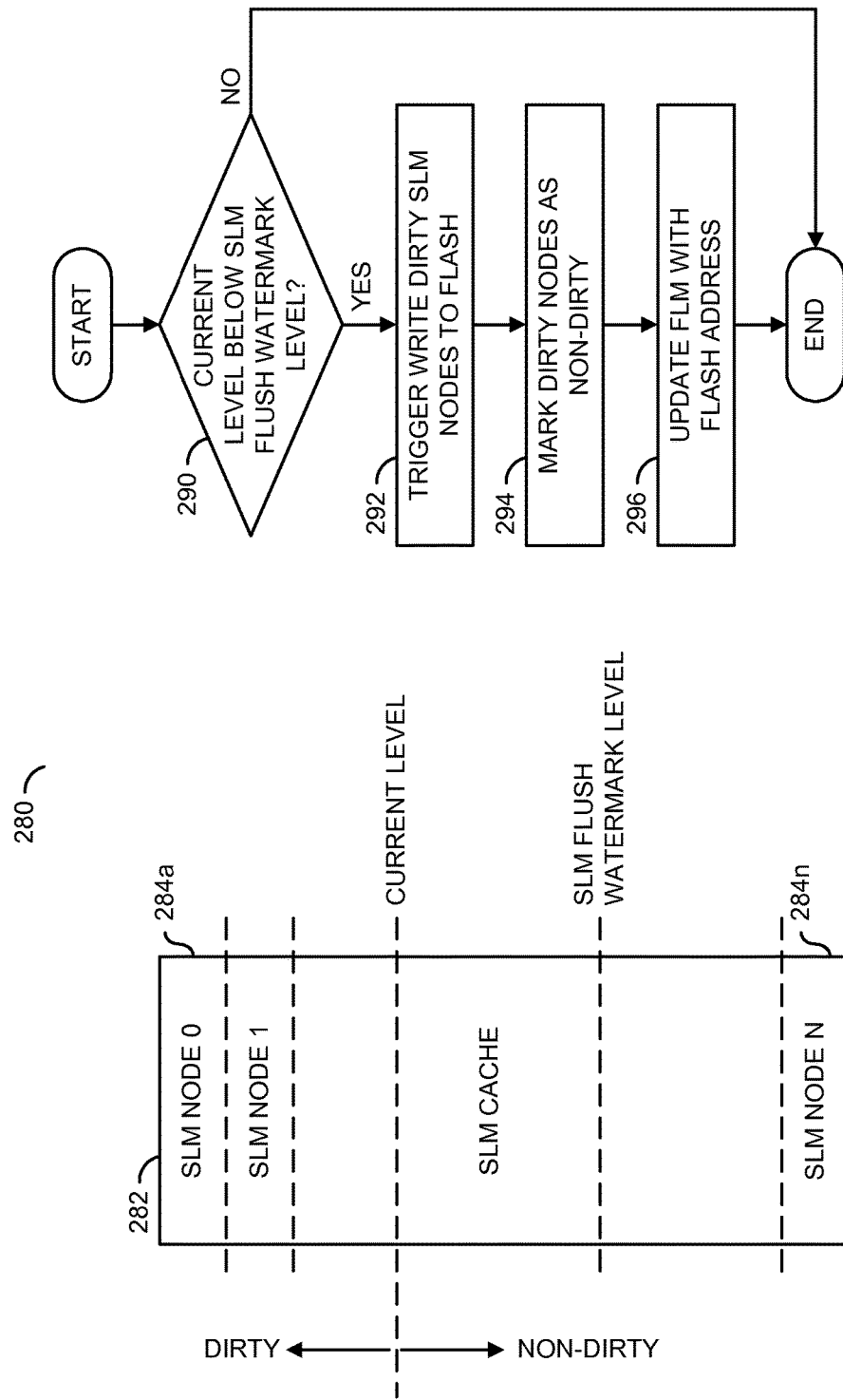
FIG. 9 is a flow diagram of a cache flush method.

Referring to FIG. 9, a flow diagram of an example implementation of a cache flush method 280 is shown. The method (or process or operation) 280 may be implemented by the circuits 120, 122 and 164. The cache 164 generally contains a group 282 of nodes 284a-284n. The nodes 284a-284n may be sorted within the group 282 into dirty nodes and non-dirty (or clean) nodes. A current level of the group 282 generally separates the dirty nodes from the non-dirty nodes. The method 280 generally comprises a decision step (or state) 290, a step (or state) 292, a step (or state) 294 and a step (or state) 296. The steps 290-296 may represent modules and/or blocks, embodiments of which include one or more of hardware circuitry, executable code (e.g., software, microcode, programming instructions, firmware, etc.) in a storage device used by the hardware circuitry, one or more electronic design tools, and/or other implementations. The sequence of the steps is shown as a representative example. Other step orders may be implemented to meet the criteria of a particular application.

In the decision step 290, the circuit 120 may check the current level of the node group 282. If the current level is below a second level map flush watermark level (e.g., not many dirty nodes), the method 280 may end. If the current level is higher than the second level map flush watermark level (e.g., too many dirty nodes), a copying of the map 166 to the circuit 122 (e.g., a flush of the map 166 to the map 160) may be performed in the step 292. In the step 294, the just-flushed dirty nodes in the node group 280 may me marked as clean. In the step 296, the first level map may be updated with the flash addresses of the second level maps.

Various embodiments may include one or more policies for handling read commands. Consider again the case where each sector has a size of several (e.g., 4) kilobytes. An initial read policy (e.g., read policy A) may handle a single read command at a time.

For example, the circuit 120 may receive a read command with the LEA of 300 with the sector count value of 8. The translation map 166 may translate the LEA of 300 to the physical address of zero and a length of 4 (because the sectors 4-7 were marked as free sectors due to the example third write command). The circuit 120 may translate the next LEA 304 to the physical address of sector 12 with a length of 8. The physical sectors 0-3 and 12-15 may be read in order or in a rearranged order to optimize the head movement.

Figure 10:
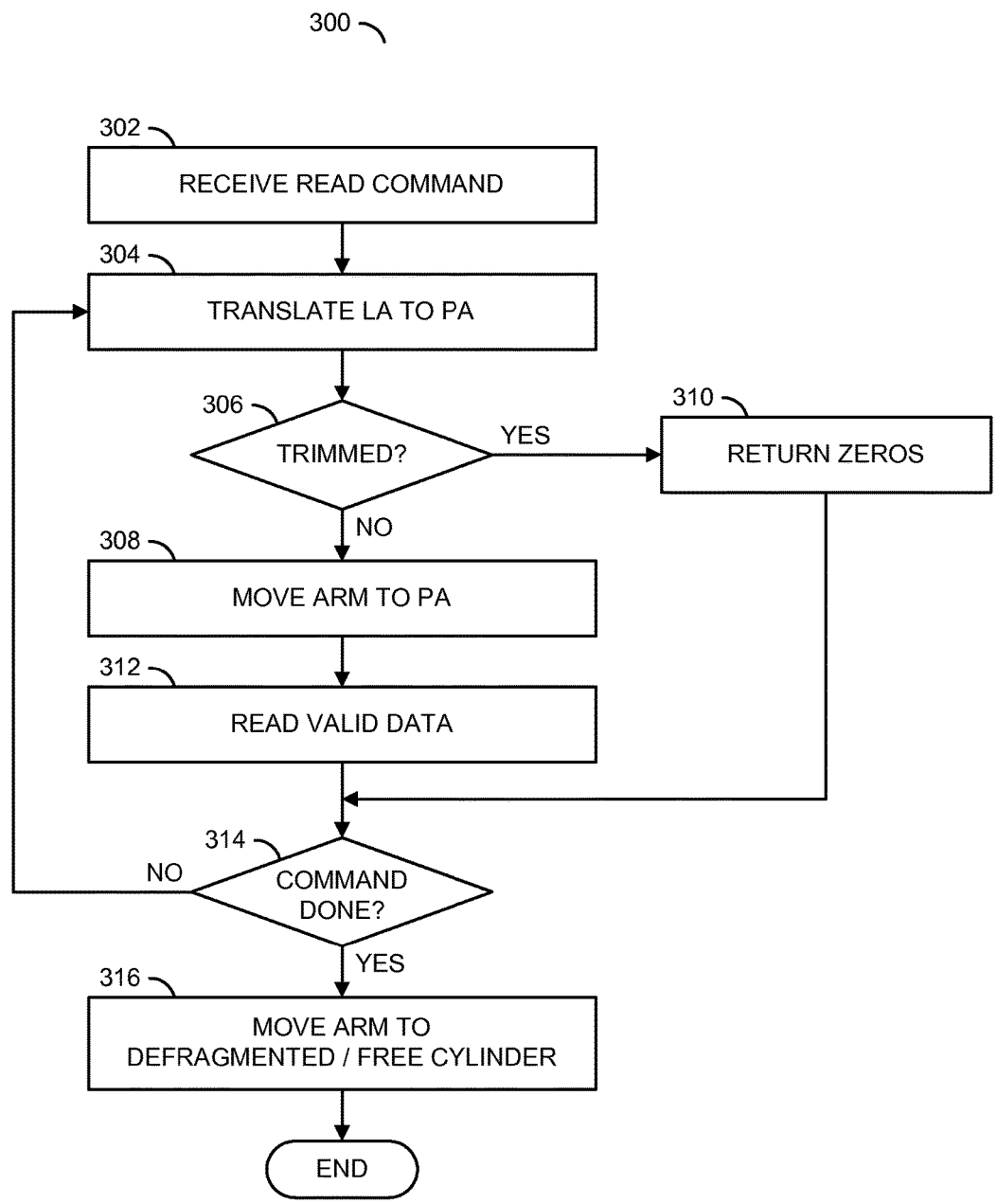
FIG. 10 is a flow diagram of a single read method.

Referring to FIG. 10, a flow diagram of an example implementation of a single read method 300 is shown. The method (or process or operation) 300 may be implemented by the device 104 and the circuits 120-124. The method 300 generally comprises a step (or state) 302, a step (or state) 304, a decision step (or state) 306, a step (or state) 308, a step (or state) 310, a step (or state) 312, a decision step (or state) 314 and a step (or state) 316. The steps 302-316 may represent modules and/or blocks, embodiments of which include one or more of hardware circuitry, executable code (e.g., software, microcode, programming instructions, firmware, etc.) in a storage device used by the hardware circuitry, one or more electronic design tools, and/or other implementations. The sequence of the steps is shown as a representative example. Other step orders may be implemented to meet the criteria of a particular application.

In the step 302, the circuit 120 may receive from the circuit 92 a read command with a logical address. The circuit 120 generally translates the logical block address into a physical address in the step 304. A check is made in the step 304 by the circuit 120 to determine if the data being accessed is currently trimmed (e.g., check the physical address for the predetermined out of range value). If the data is currently trimmed, the circuit 120 may return all zeros to the circuit 92 in the step 310.

If the requested data is currently valid (e.g., is not currently trimmed), the circuit 120 may command the circuit 124 to move the arm to position the head assembly 148 in the appropriate cylinder in the step 308. Once the head assembly 148 is positioned, the requested read data may be read from the platter 150 in the step 312 by the circuit 124.

A check may be performed by the circuit 120 in the step 314 to determine if all of the requested read data has been obtained from the platter 150. If not, the method 300 may return to the step 304 to determine the next physical address to be read. Once the read request has been serviced, the circuits 120 and 124 may command movement of the head assembly 148 to a defragmented/free cylinder in the step 316 in preparation for a write command.

Figure 11:
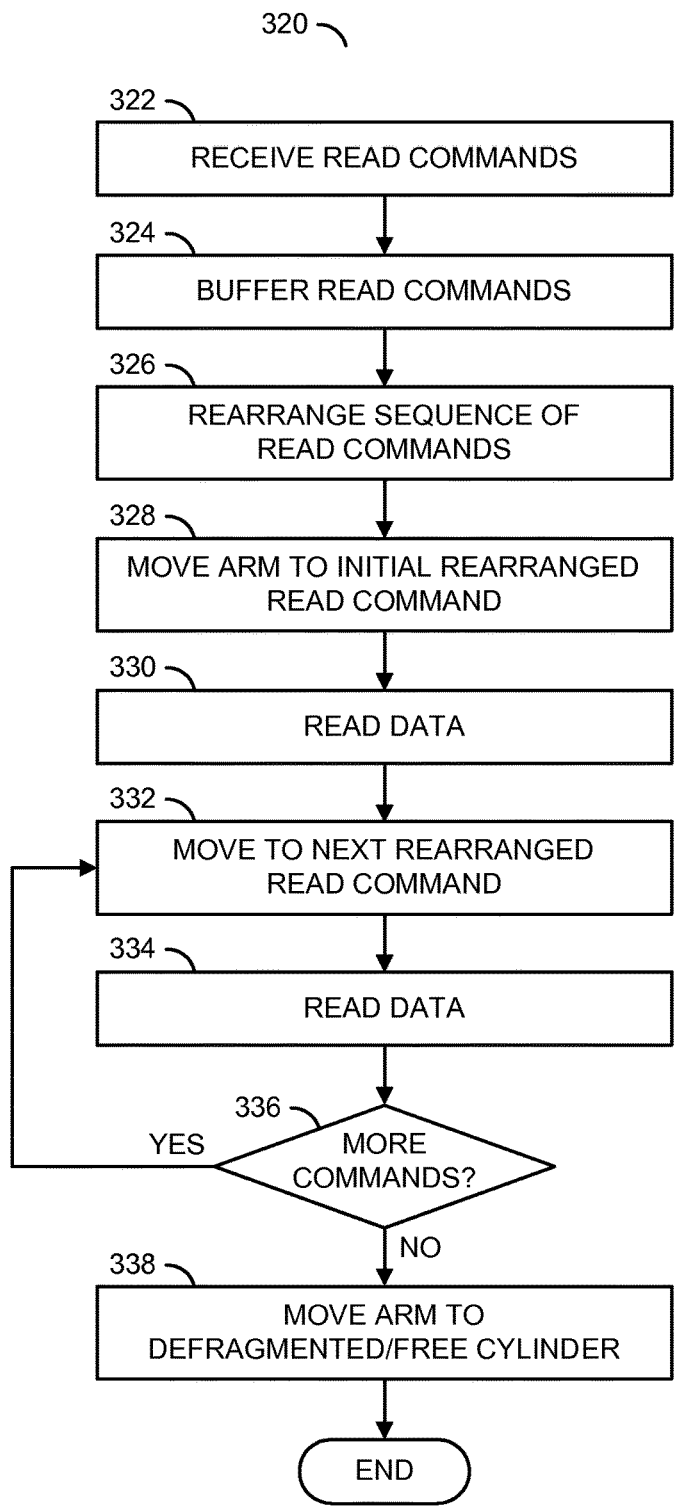
FIG. 11 is a flow diagram of a multiple read method.

Referring to FIG. 11, a flow diagram of an example implementation of a multiple read method 320 is shown. The method (or process or operation) 320 may be implemented by the device 104 and the circuits 120-124. The method 320 generally comprises a step (or state) 322, a step (or state) 324, a step (or state) 326, a step (or state) 328, a step (or state) 330, a step (or state) 332, a step (or state) 334, a decision step (or state) 336 and a step (or state) 338. The steps 322-338 may represent modules and/or blocks, embodiments of which include one or more of hardware circuitry, executable code (e.g., software, microcode, programming instructions, firmware, etc.) in a storage device used by the hardware circuitry, one or more electronic design tools, and/or other implementations. The sequence of the steps is shown as a representative example. Other step orders may be implemented to meet the criteria of a particular application.

In the step 322, the circuit 120 may receive from the circuit 92 a rapid sequence of multiple read commands. In the step 324, the circuit 120 may buffer the read commands. The circuit 120 may subsequently rearrange the sequence of read commands in the step 326 to improve movement efficiency of the head assembly 148 during the read sequence.

In the step 328, the circuits 120 and 124 may command movement of the head assembly 148 to a cylinder corresponding to an initial read command in the rearranged sequence of read commands. An initial read of the read data may be performed by the circuits 120 and 124 in the step 330. In the step 332, the circuits 120 and 124 may command movement of the head assembly 148 to a next read command in the rearranged sequence. The circuits 120 and 124 may read the next read data from the media in the step 334.

If one or more read commands remain to be serviced, the decision step 336 may return to the step 332. Thereafter, the head assembly 148 may be moved again and the next read data may be read from the media. The loop around the step 332, 334 and 336 may continue until all of the read commands in the rearranged list of read commands have been serviced. In the step 338, the circuit 120 and 124 may command movement of the head assembly 148 to a defragmented/free cylinder in the step 338 to prepare for a new write command.

Figure 12:
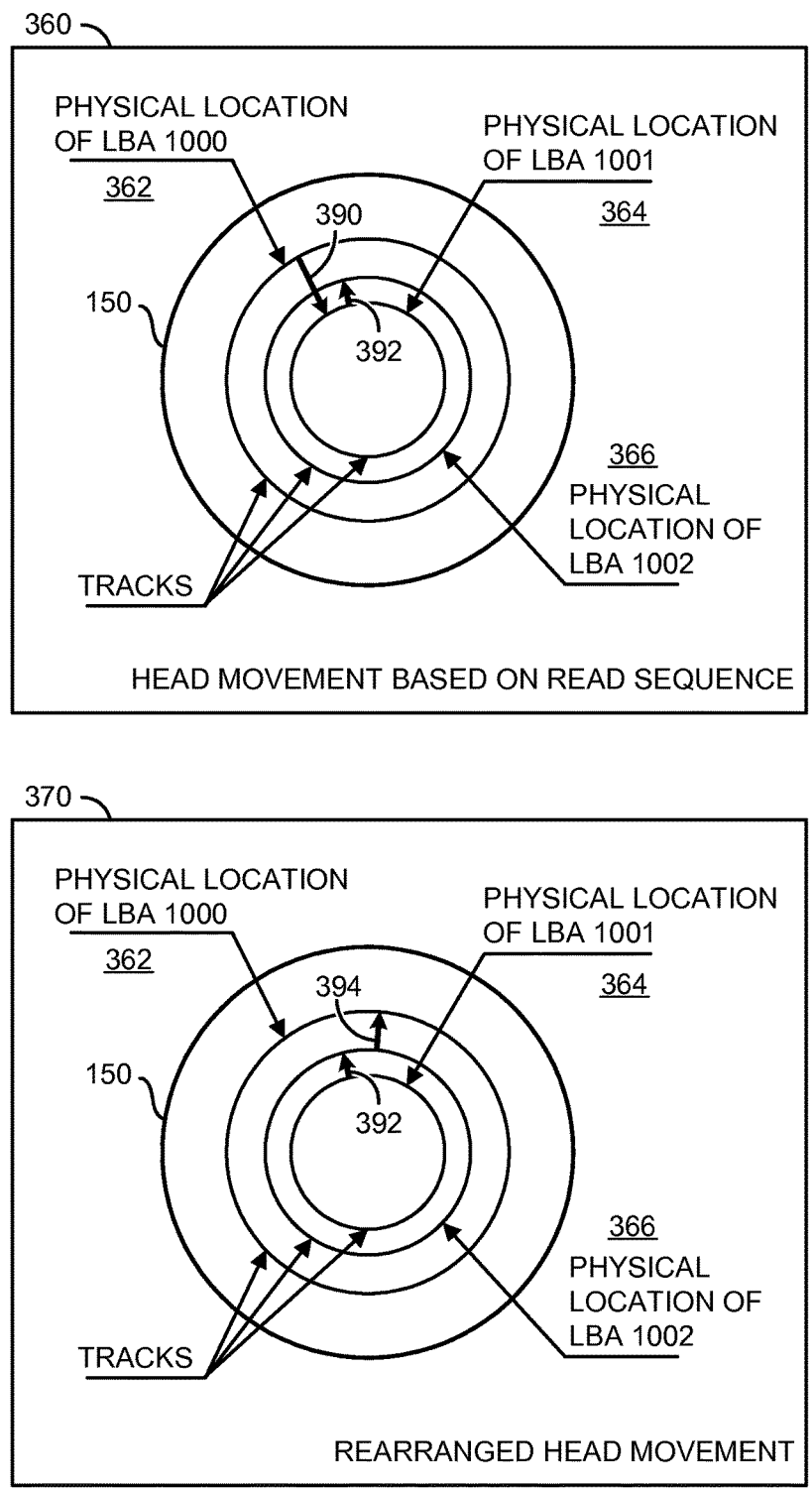
FIG. 12 is an illustration of head movement based on read sequences with and without rearrangement.

Referring to FIG. 12, diagrams illustrating head movement based on a read sequence with and without rearrangement are shown. In an example movement without rearrangement 360, a temporal sequence of three read commands 362 (e.g., LBA 1000), 364 (e.g., LBA 1001) and 366 (e.g., LBA 1002) is shown. To service the read command 362, the head assembly 148 is moved from a current location to an outer track to access the LBA 1000. After the read command 362 has been completed, the head assembly 148 is moved 390 to an inner track to service the read command 364 to access the LBA 1001. After the read command 364 has been completed, the head assembly 148 is moved again 392 to a middle track to service the read command 366.

In the example movement with the rearrangement 370, the rearranged sequence of read commands may be 364, 366 and 362. The head assembly 148 may be initially moved to the inner track to service the read command 364 to access the LBA 1001. After the read command 364 has completed, the head assembly 148 may be moved 392 to the middle track to service the read request 366. After the read command 366 has completed, the head assembly 148 may be moved again 394 to the outer track to service the read request 362. By rearranging the read commands, the head assembly 148 movement may be along an overall shorter path because the movement 394 in the rearranged sequence is shorter than the movement 390 in the original sequence. Thus, the rearranged read commands may be serviced in less time than in the original sequence of commands.

Figure 13:
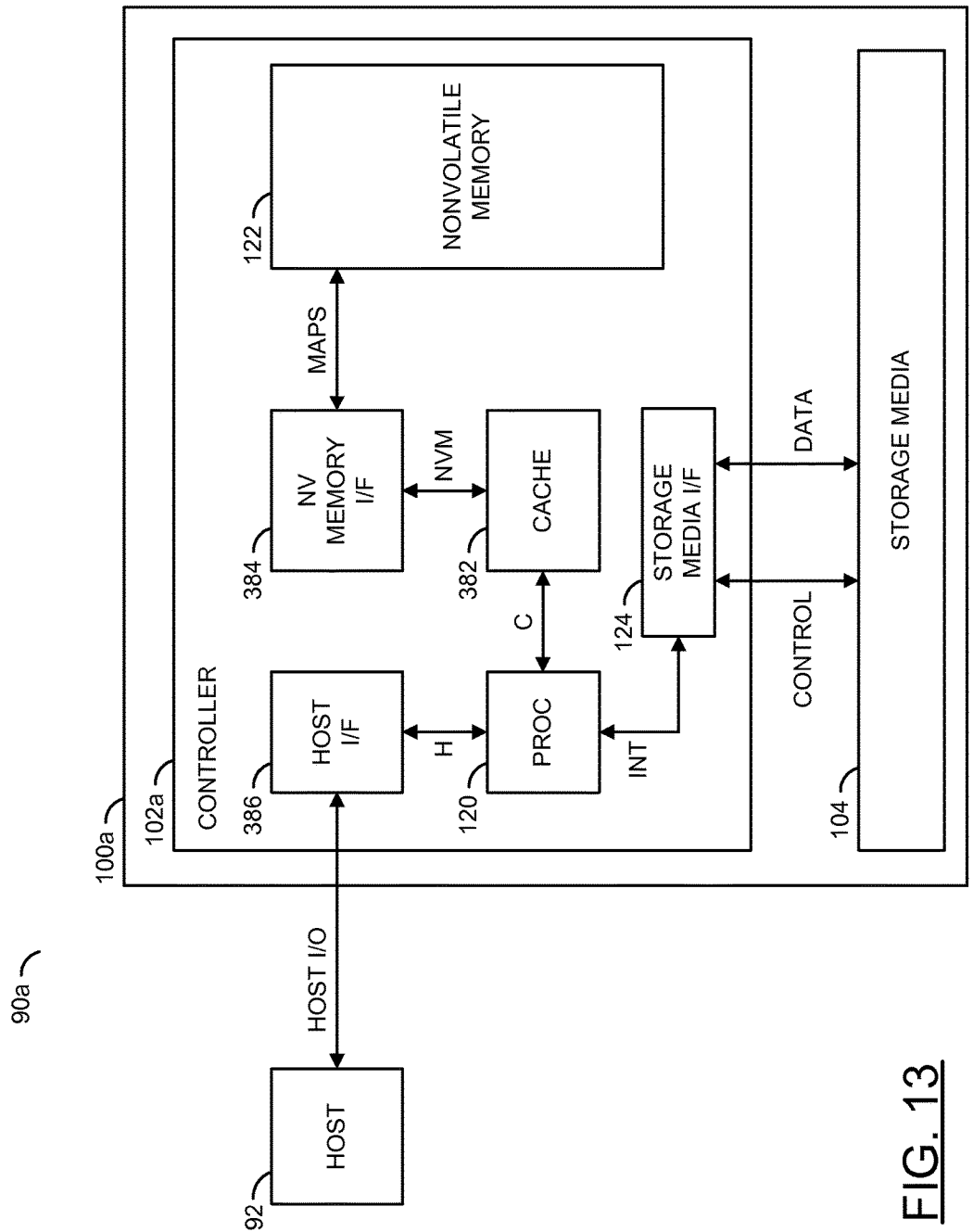
FIG. 13 is a block diagram of another apparatus.

Referring to FIG. 13, a block diagram of an example implementation of an apparatus 90a is shown. The apparatus 90a may be a variation on the apparatus 90. The apparatus 90a generally comprises the circuit 92 and a block (or circuit) 100a. The circuit 100a generally comprises a block (or circuit) 102a and the device 104. The circuit 102a generally comprises the circuit 120, the circuit 122, the circuit 124, a block (or circuit) 382, a block (or circuit) 384 and a block (or circuit) 386. The circuits 100a to 386 may represent modules and/or blocks, embodiments of which include one or more of hardware circuitry, executable code (e.g., software, microcode, programming instructions, firmware, etc.) in a storage device used by the hardware circuitry, one or more electronic design tools, and/or other implementations.

The signal MAPS may be exchanged between the circuit 122 and the circuit 384. One or more signals (e.g., H) may be exchanged between the circuit 120 and the circuit 386. The signal H generally carries commands and data received from and sent to the host circuit 92. Components of the signal H may include, but are not limited to, read commands, read data, write command, write data, trim commands and/or defragment commands. One or more signals NVM may be exchanged between the circuit 382 and the circuit 384. Components of the signal NVM may convey nonvolatile memory commands and map data. One or more signals (e.g., C) may be exchanged between the circuit 120 and the circuit 382. Components of the signal C may include, but are not limited to, the map data, cache flushing commands and/or cache fetching commands.

The circuit 382 is shown as the cache circuit external to the circuit 120. The circuit 164 may be in communication with the circuit 120 to permit the circuit 120 to access the maps 166 and 168. The circuit 382 may also be in communication with the circuit 384 to flush the cache data to the circuit 122 and fetch data from the circuit 122 to update the cache.

The circuit 384 may implement a nonvolatile memory interface circuit. The circuit 384 is generally operational to control the circuit 122, read data from the circuit 122 and write data to the circuit 122. Additional operations of the circuit 384 may include, but are not limited to, error correction encode data written to the circuit 122, decode (e.g., hard decode and/or soft decode) and error correct data read from the circuit 122, adjust read threshold voltages in the circuit 122, perform wear leveling on blocks in the circuit 122, perform garbage collection in the circuit 122, control read amplification in the circuit 122, control read disturb in the circuit 122, and command block erases in the circuit 122.

The circuit 386 may implement a host interface circuit. The circuit 386 is generally operational to provide communication between the circuit 120 and the circuit 92 via the signal HOST I/O.

Other signals may be implemented between the circuits 92 and 386 to meet the criteria of a particular application.

Various embodiments of the present invention may aid in minimizing head seek during random writes thereby improving both writing latency and writing throughput. Writing to the nearest free sectors generally results in higher writing speed. Writing to multiple platter surfaces in parallel may also improve writing speed. An endurance of a servo head assembly may be improved by reducing the average movement used in servicing write commands. The trim operations may be easily supported and may result in little to no head assembly/voice coil motor movement.

Various embodiments of the invention may implement a sector translation layer to optimize the seek time and rotational delay that, in turn, generally improve the throughput of the drive. The controller may use a persistent storage to map LBA-to-CHS (e.g., logical address-to-physical address) address translations.

Flash memory may be used at the persistent storage for such applications. When a write request received from the host, a map of free sectors nearest to the current head position may be analyzed. The write data is subsequently written to the nearest unmapped free sectors. The write technique generally reduces head movement and so may reduce both the seek time delay and the rotational latency delay.

Various embodiments of the invention may reorder read commands so that the head traversal may be optimized (e.g., moved in a single direction). A buffer management capability may be included in the hard disk drive controller to transfer the read data to correct offsets in a buffer. The resulting overall read time may be reduced relative to reading the platter in the same order that the read commands were received.

The functions and structures illustrated in the diagrams of FIGS. 1-13 may be designed, implemented, modeled, emulated and/or simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented by the preparation of ASICs (application specific integrated circuits), FPGAs (field programmable gate arrays), PLDs (programmable logic devices), CPLDs (complex programmable logic device), sea-of-gates, ASSPs (application specific standard products), one or more integrated circuits, circuitry based on hardware description languages, flash memory, nonvolatile memory, random access memory, read-only memory, magnetic disks, floppy disks, optical disks such as DVDs and DVD RAM, and magneto-optical disks, modifications of which will be readily apparent to those skilled in the art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a memory configured to store data, the memory comprising a write head and a plurality of sectors in a plurality of tracks; and
   a controller comprising a cache and a solid-state memory, wherein the solid-state memory is configured to store a sector map and a translation map, the sector map has a plurality of flags, and the controller is configured to
      receive a write command that has a logical block address,
      copy a portion less than all of the sector map from the solid-state memory to the cache based on a current position of the write head and an angular speed capability of a voice coil motor that moves the write head relative to how fast the flags of one of the tracks can be copied from the solid-state memory to the cache,
      select one or more of the sectors from the sector map in the cache that are marked as free and are temporally proximate to the write head based on the angular speed capability of the voice coil motor and a rotational speed of the memory,
      write new data associated with the write command in the one or more sectors selected, and
      update the sector map in the cache according to the sectors where the new data was written, wherein each flag in the sector map corresponds to a respective one of the sectors and indicates whether the respective one of the sectors contains valid data or is free.

2. The apparatus according to claim 1, wherein the sector map and the translation map form a sector translation layer of the memory, and the memory comprises one or more rotating media and two or more of the write heads.

3. The apparatus according to claim 1, wherein the controller is further configured to begin a fetch of a portion less than all of a second level map of the translation map that corresponds to the logical block address of the write command from the solid-state memory to the cache in parallel to selecting the one or more sectors from the sector map in the cache.

4. The apparatus according to claim 1, wherein the sectors temporally proximate to the write head comprise the sectors in a current one of the tracks presently aligned with the write head and one or more of the tracks neighboring the current track that the write head can reach relative to how fast the flags can be copied from the solid-state memory to the cache.

5. The apparatus according to claim 1, wherein the controller is further configured to
move the valid data by a defragmentation operation to consolidate free space and to serialize data to ease access.

6. The apparatus according to claim 1, wherein the controller is further configured to
deallocate from the translation map one or more of the sectors that contain the valid data per the sector map in response to a trim command, and
mark the sectors deallocated from the translation map as free in the sector map, wherein data in the sectors identified by the trim command is unaltered by the trim command.

7. The apparatus according to claim 1, wherein the controller is further configured to
receive a plurality of read commands in a first order, and
rearrange the read commands in a second order to allow a read head to move in a single direction while fulfilling the read commands.

8. The apparatus according to claim 1, wherein the memory and the controller form part of a hard disk drive.

9. The apparatus according to claim 1, wherein the controller is further configure to
update the translation map in the cache to associate the logical block address of the write command with a physical address of the sectors where the new data was written.

10. A method of maintaining a sector translation layer in a hard disk drive, comprising the steps of:
receiving at the hard disk drive a write command that has a logical block address, wherein the hard disk drive comprises a write head, a plurality of sectors in a plurality of tracks of a memory, a sector map, a translation map, the sector map has a plurality of flags, and each flag in the sector map corresponds to a respective one of the sectors and indicates whether the respective one of the sectors contains valid data or is free;
copying a portion less than all of the sector map from a solid-state memory to a cache based on a current position of the write head and an angular speed capability of a voice coil motor that moves the write head relative to how fast the flags of one of the tracks can be copied from the solid-state memory to the cache;
selecting one or more of the sectors from the sector map in the cache that are marked as free and are temporally proximate to the write head based on the angular speed capability of the voice coil motor and a rotational speed of the memory;
writing new data associated with the write command in the one or more sectors selected; and
updating the sector map in the cache according to the sectors where the new data was written.

11. The method according to claim 10, wherein the sector map and the translation map form a sector translation layer of the memory, and the memory comprises one or more rotating media and two or more of the write heads.

12. The method according to claim 10, further comprising the step of:
begin fetching a portion less than all of a second level map of the translation map that corresponds to the logical block address of the write command from the solid-state memory to the cache in parallel to the selecting of the one or more sectors from the sector map in the cache.

13. The method according to claim 10, wherein the sectors temporally proximate to the write head comprise the sectors in a current one of the tracks presently aligned with the write head and one or more of the tracks neighboring the current track that the write head can reach relative to how fast the flags can be copied from the solid-state memory to the cache.

14. The method according to claim 10, further comprising the step of:
moving the valid data by a defragmentation operation to consolidate free space and to serialize data to ease access.

15. The method according to claim 10, further comprising the steps of:
deallocating from the translation map one or more of the sectors that contain the valid data per the sector map in response to a trim command; and
marking the sectors deallocated from the translation map as free in the sector map, wherein data in the sectors identified by the trim command is unaltered by the trim command.

16. The method according to claim 10, further comprising the steps of:
receiving a plurality of read commands in a first order; and
rearranging the read commands in a second order to allow a read head to move in a single direction while fulfilling the read commands.

17. The method according to claim 10, further comprising the step of:
updating the translation map in the cache to associate the logical block address of the write command with a physical address of the sectors where the new data was written.

18. The method according to claim 10, wherein the step are performed in a hard disk drive.

19. An apparatus comprising:
an interface circuit configured to process a plurality of read/write operations to/from a memory, wherein the memory comprises a write head and a plurality of sectors in a plurality of tracks; and
a control circuit comprising a cache and a solid-state memory, wherein the solid-state memory is configured to store a sector map and a translation map, the sector map has a plurality of flags, and the control circuit is configured to
receive a write command that has a logical block address,
copy a portion less than all of the sector map from the solid-state memory to the cache based on a current position of the write head and an angular speed capability of a voice coil motor that moves the write head relative to how fast the flags of one of the tracks can be copied from the solid-state memory to the cache, select one or more of the sectors from the sector map in the cache that are marked as free and are temporally proximate to the write head based on the angular speed capability of the voice coil motor and a rotational speed of the memory, write new data associated with the write command in the one or more sectors selected, and update the sector map in the cache according to the sectors where the new data was written, wherein each flag in the sector map corresponds to a respective one of the sectors and indicates whether the respective one of the sectors contains valid data or is free.

20. The apparatus according to claim 19, wherein the interface circuit and the control circuit form part of a hard disk drive.

* * * * *